No. 676,631. Patented June 18, 1901.
H. P. D. OHLHAVER.
CENTRIFUGAL CREAM SEPARATOR.
(Application filed Jan. 8, 1901.)

(No Model.) 2 Sheets—Sheet 1.

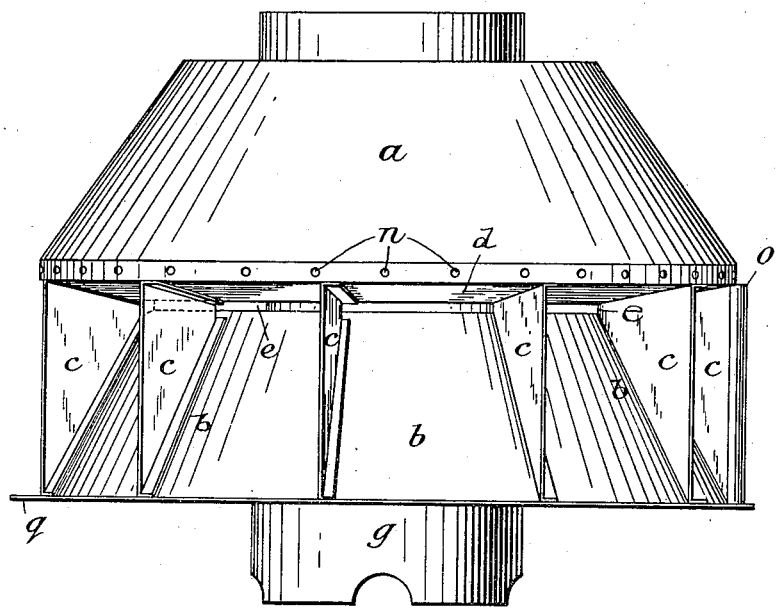
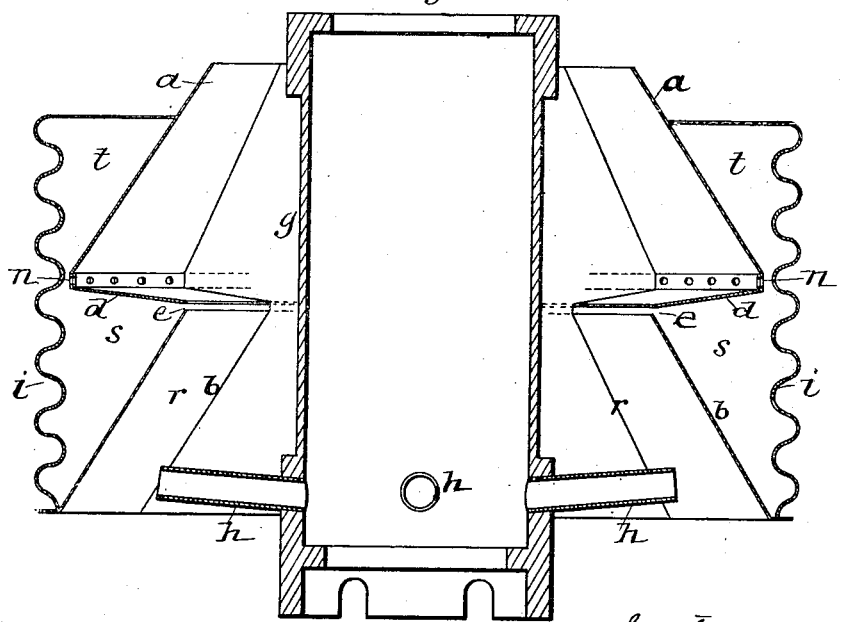

UNITED STATES PATENT OFFICE.

HINRICH PETER DIEDRICH OHLHAVER, OF HANOVER, GERMANY.

CENTRIFUGAL CREAM-SEPARATOR.

SPECIFICATION forming part of Letters Patent No. 676,631, dated June 18, 1901.

Application filed January 8, 1901. Serial No. 42,564. (No model.)

*To all whom it may concern:*

Be it known that I, HINRICH PETER DIEDRICH OHLHAVER, a subject of the Emperor of Germany, residing at Hanover, in the Province of Hanover, Germany, have invented a new and useful Centrifugal Separator, of which the following is a specification.

The invention herein relates to a cream-separator in which the separation is effected by centrifugal force in a rotating bowl, and in the claims hereto appended the precise improvement will be set out in connection with the accompanying drawings, and in which—

Figure 1:
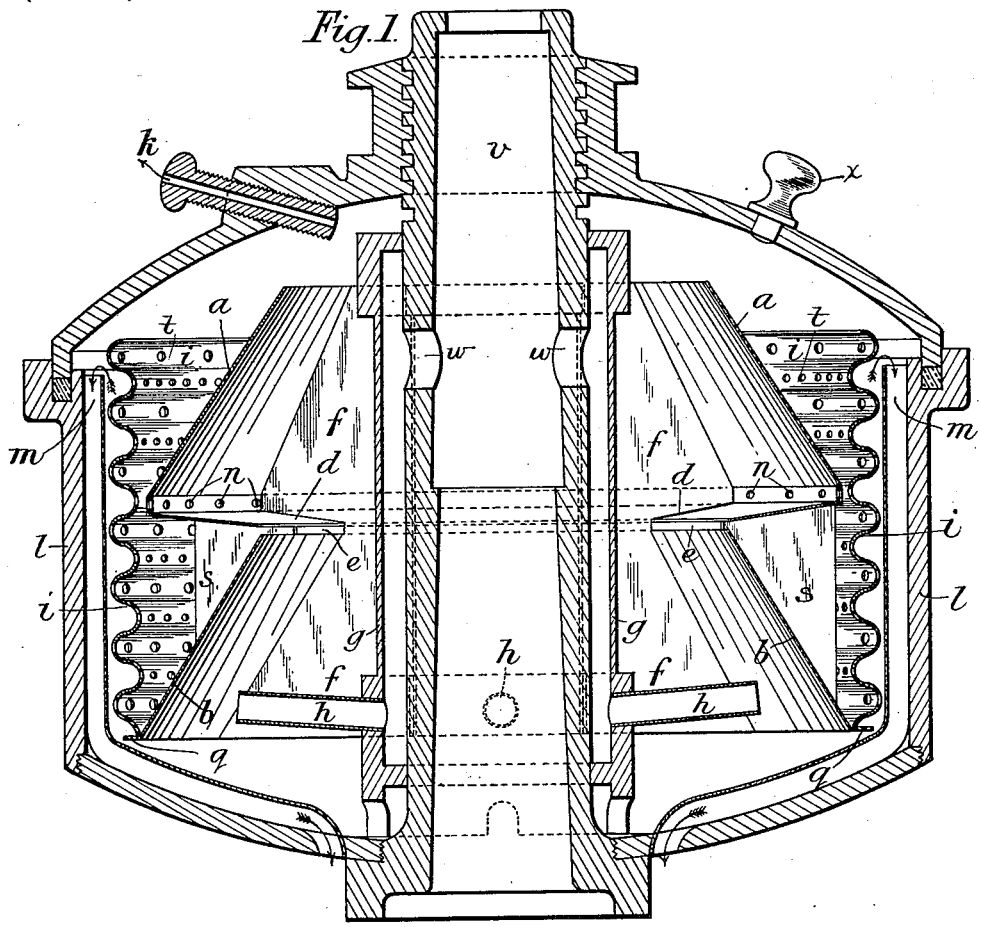
Figure 2:
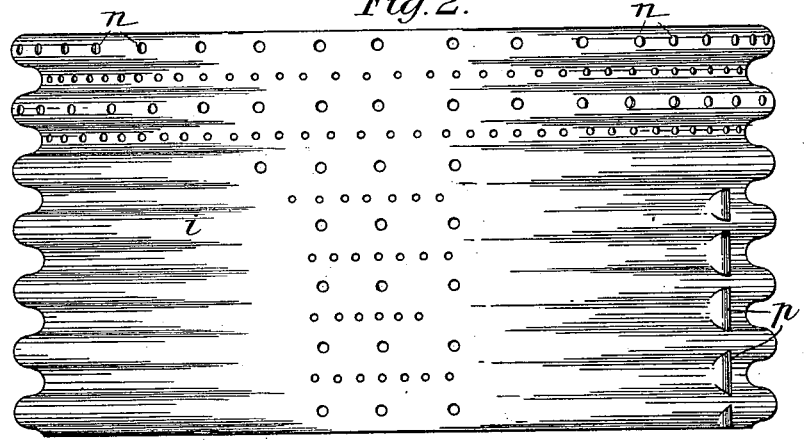

Figure 1 is a vertical section of the separator. Fig. 2 shows in elevation that part of the separator designated the "perforated mantle," mounted between the bowl and superposed cones and surrounding the cones. Fig. 3 shows in elevation the centrifugal part of the separator. Fig. 4 shows in vertical section the centrifugal part and the inclosing perforated mantle.

The separation of the cream from the milk is effected by the well-known operation in which skimmed milk, having the greatest specific gravity, is forced outwardly from the center of rotation, while the creamy particles are forced inward toward the center of rotation, and each delivered into separate receptacles.

The bowl $l$ is mounted for rotation upon a shaft (not shown) and to which the bowl is secured by its central tube $v$, through which the milk is introduced at its upper open end and from which it passes into the centrifugal device by openings $w$ in the walls of the tube. Surrounding the feed-tube and rising from the bottom of the bowl is a tube $g$, which forms an annular space around the central tube, from which the milk passes by the horizontal tubes $h$ into the bowl near its bottom. The bowl is provided with a suitably-sealed cover preferably screwed upon the upper end of the central tube, and on the inner walls of the bowl are fixed a plurality of vertical tubes, which open at their upper ends at $m$ into the top of the chamber of the bowl, their lower ends opening at the bottom of the latter around the central tube, and it is through these wall-tubes the skimmed milk passes continuously during the centrifugal separation, as indicated by the arrows in Fig. 1, while the separated cream passes from the bowl-chamber at its top through a tubular plug $k$ in the cover, as I shall more particularly presently state.

Mounted upon the sleeve $g$ are two truncated cones $a$ and $b$, and surrounding these is a perforated mantle $i$, which coöperate in producing the centrifugal separation, as I will now state. The truncated cones divide the chamber of the bowl into an upper and a lower section by means of a partition $d$, which is circular and projects inward from the base of the upper cone and terminates over the edge of the lower cone and forms thereby an annular opening $e$ between the cones. Radial ribs or wings $f$ on the interior of the cones serve as the means of mounting the cones upon the sleeve $g$, the upper cone of which opens beneath the bowl-cover, while the lower cone opens into the bowl-chamber at the junction of and beneath the partition $d$. The upper cone springs from the outer edge of this partition and joins it by a vertical rim having holes $n$, while at the inner edge of the partition and between it and the upper edge of the lower cone is an annular opening $e$, the purpose of which and of the holes around the base of the upper cone I will presently state. Around the outside of the bottom cone are radial wings $c$, the effect of which is to facilitate the separation. This mounting and joining of the cones provides a free space around the sleeve of the central tube for the collection and passage of the cream within and from the bowl-cover through its tubular plug. The radial pipes $h$ of this sleeve open into the base of the lower cone, which opens into the bottom of the bowl, and these pipes deliver the milk to be separated against the inner wall of this cone, so that the open space between the cones is above these milk-delivering tubes.

A perforated cylinder or mantle $i$ is provided as an encircling wall for the cones and opens at the top into the bowl-chamber. This mantle is mounted upon and engages a circumferential rim $q$ at the base of the lower cone, and its diameter is such as to be free of the milk-outlet wall-tubes and to leave a free space between it and the inner wall of the bowl. It is perforated with holes $n$ and is also preferably formed with horizontal parallel corrugations, and the holes are preferably of variable area, as I will now describe, and for an advantageous purpose. The primary function of this mantle is to provide a zone into which the completely-separated milk can gather and pass off by an outward flow through the holes of the mantle, while the cream is gathered within the mantle and is forced up by the centrifugal action of the cones into the top chamber. When the walls of the mantle are corrugated, the holes are placed in the outward convex corrugations and in the alternate grooves of the surface. Preferably a less number and larger holes are made in the said convex corrugations through which the skimmed milk mainly passes.

The milk entering the central tube on entering the bowl is subjected to a preliminary separation in the space $r$ within the lower cone. The cream, which is specifically lighter than the separated milk, makes its way toward the axis of the bowl, where it rises and passes out continuously through the plug. The heavier blue milk, which, however, still contains a considerable quantity of fat, flows down the cone-surface $b$ and around the lower edge, rising in the space between the mantle and the inner wall of the bowl and at the same time filling the space $s$ between the cone and the mantle. In this space $s$ the partially-separated milk is subjected to increased centrifugal action by reason of the wings $c$ of the lower cone imparting to the milk the full velocity of the bowl. The cream separated by the action of these wings makes its way up the outside of the cone $b$ and reaches the cream column at the center through the annular opening $e$ between the horizontal partition and the top of the lower cone. To avoid disturbance due to the increased velocity imparted by the wings $c$ to the fluid within the mantle-space, the partition $d$ is provided, which counteracts the tendency there would be for the liquid to escape at the top edges of the wings $c$, and thereby again mix with the cream column already separated. This function of the partition is important, as it prevents the circulation of currents which would injuriously affect the separation. It also causes the nearly-separated milk to pass into the space $t$ between the outer surface of the cone $a$ and the mantle with nearly the full velocity of the rotation of the bowl and in an even stream without obstructing-currents. In the space around the upper cone the final extraction of the most adhesive particles of fat takes place. As soon as the milk reaches this upper space a passage is opened for any particles of cream without liability to meet with obstruction until the cone-surface is reached, in relation to which the creamy particles make their way and rise along this coned surface to the top, where they join the cream column passing out through the cover-plug.

The perforated mantle forms an annular space between it and the inner wall of the bowl where the skimmed milk can freely collect and from which a continuous flow is provided by means of the tubes $m$. The holes $n$ in the circumferential rim at the base of the upper cone provide for the outlet of skimmed milk which would collect within the base of the upper cone.

When once separated, the cones and the partition prevent any further mixing of the cream and milk, thereby rendering more effective the separation. In the relation of the base of the upper cone to the top of the lower cone the partition forms a bottom standing inward from the perforated rim of the upper cone, and the inner circular edge of the partition terminates at or about and overhangs the top edge of the lower cone, and it is at this junction of the edge parts at which the annular opening $e$ is formed, through which the cream passes freely upward from the the outer walls of the lower cone to the inner side of the upper cone, and in this way the separation is divided into two stages by the coöperative external and internal action of the cones and their inclosing mantle. It is also important to note that the sleeve, its radial tubes, and the cones are connected as an entirety, can be easily set in the bowl, and removed for cleansing, and that the sleeve has top and bottom collars fitting it closely upon the central tube. It is also important to note that the outlet-pipes for the skimmed milk extend to and open within the bowl-chamber at the upper end of the perforated mantle, so that the centrifugal force is exerted on the milk during its passage along the walls of the mantle to the point of exit. It is also important to note the superposed truncated cones are open at both ends, that the lower one has communication with the feed-tube through the sleeve, and that the opening $e$ intersects and divides the cones, so that the separation is both external and internal of the cones.

The cream-outlet plug being on one side of the central feed-tube, I provide for counterbalancing the weight of said plug by the plug $x$ in the cap on the other side of said tube.

Looking at Fig. 4 it will be noted that the separating device proper is a single structure comprising the sleeve having the radial tubes at its lower end, the superposed cones, and the perforated mantle mounted upon the base of the lower cone, and that as an entirety it is conveniently adapted for removal for cleaning and for replacing upon the central tube.

I claim—

1. In a centrifugal separator and in combination with a rotating bowl, a central feed-tube, a liner mounted upon said tube composed of superposed cones, the upper cone having an internally-projecting partition at its base overhanging the upper edge of the lower cone, and forming thereby an annular opening between the cones, whereby communication is made at the base of the upper cone with the interior thereof at the apex of the lower cone for the purpose stated.

2. In a centrifugal separator and in combination with a rotating bowl, a central feed-tube, a liner mounted upon said tube composed of superposed cones, the upper cone having an internally-projecting partition at its base and forming thereby an annular opening between the cones, the upper cone provided around its base above the partition with apertures for the purpose stated.

3. In a centrifugal separator and in combination with a rotating bowl, a central feed-tube, a liner mounted upon said tube composed of superposed cones and a mantle surrounding the cones having its walls horizontally corrugated and provided with perforations.

4. In a centrifugal separator and in combination with a rotating bowl, a central feed-tube, a liner mounted upon said tube composed of superposed cones the base of the upper cone having such relation to the apex of the lower cone as to form an annular opening between them in communication with the interior and exterior of the cones, the lower cone having external radial wings and a perforated mantle surrounding the cones.

5. In a centrifugal separator, a separating device composed of superposed cones, a sleeve upon which they are mounted having radial tubes within the lower cone and a mantle having perforations, mounted upon the base of the lower cone and opening around the upper cone, the several parts constructed as an entirety and the sleeve provided with means whereby the device may be mounted for use.

In testimony that I claim the foregoing as my invention I have signed my name in presence of two subscribing witnesses.

HINRICH PETER DIEDRICH OHLHAVER.

Witnesses:
 LEONORE KASCH,
 C. C. STEVENSON.